| United States Patent [19] | [11] Patent Number: 4,894,160 |
| Abe et al. | [45] Date of Patent: Jan. 16, 1990 |

[54] HONEYCOMB STRUCTURE FOR FLUID FILTRATION

[75] Inventors: Fumio Abe, Handa; Hiroshi Mori, Nagoya, both of Japan

[73] Assignee: NGK Insulators, Ltd., Nagoya, Japan

[21] Appl. No.: 240,723

[22] Filed: Sep. 6, 1988

[30] Foreign Application Priority Data

Sep. 4, 1987 [JP] Japan .................................. 62-222771
Sep. 4, 1987 [JP] Japan .................................. 62-222772

[51] Int. Cl.$^4$ ............................................. B01D 29/00
[52] U.S. Cl. ..................................... 210/510.1; 55/523
[58] Field of Search ................. 55/282, 523, DIG. 10, 55/DIG. 30, DIG. 5, 482; 422/180; 210/510.1, 321.6

[56] References Cited

U.S. PATENT DOCUMENTS 4,069,157 1/1978 Hoover et al. .
4,417,908 11/1983 Pitcher .......................... 55/DIG. 30

*Primary Examiner*—Frank Sever
*Attorney, Agent, or Firm*—Arnold, White & Durkee

[57] ABSTRACT

A honeycomb structure for fluid filtration includes a support of porous ceramic material having a multiplicity of axially parallel passageways extending therethrough and uniformly spaced by porous partition walls to permit flow of fluid under pressure passing therethrough and a selective membrane coated onto the surface of the passageways to separate one or more components from the fluid and to permit flow of filtrate passing therethrough to be carried through the porous partition walls to the exterior surface of the partition walls for collection. In the honeycomb structure, the partition walls are formed to permit the passage of filtrte at a flow quantity more than twenty times the flow quantity of filtrate passing through the selective membrane and partition walls, and an average pore size of the selective membrane is about from 10 to 10000 angstroms.

14 Claims, 3 Drawing Sheets

HONEYCOMB STRUCTURE FOR FLUID FILTRATION

BACKGROUND OF THE INVENTION

1. Field of the Invention

The present invention relates to a honeycomb structure for fluid filtration, and more particularly to a honeycomb structure adapted for microfiltration or ultrafiltration in pharmaceutical preparation, food and beverage processing and other applications and for gas separation on the basis of Knudsen gas diffusion or capillary condensation.

2. Description of the Prior Art

In U.S. Pat. No. 4,069,157 granted to Hoover et al. on Jan. 17, 1978, there is disclosed an ultrafiltration device which comprises an integral support of porous ceramic material having substantially uniformly spaced and axially parallel passageways formed therein and a permselective membrane coated onto the surface of the passageways. The ultrafiltration device is characterized in that the surface area (SA) of the passageways in the porous support is about from 300 to 2,000 square meters per cubic meter of support, the pores in the support have diameters of about from 2 to 20 microns and the decimal proportion of the volume of the pores to the total volume occupied by the material (PV) is about from 0.30 to 0.60, the decimal proportion of the volume of the support material exclusive of the passageways to the total volume of the support (SV) is about from 0.40 to 0.75, and the permeability factor (PF) of the support, defined as $PF = PV \times SV/SA$, is greater than about $1.0 \times 10^{-4}$ meter.

In the patent to Hoover et al., it is pointed out that the permeability factor (PF) of the support is important to provide adequate flow of filtrate through the membrane and the ceramic support material to be carried through the porous support structure to the exterior surface of the support for collection. The patent to Hoover et al., however, fails to disclose or suggest the fact that the filtration efficiency of the device is greatly influenced by flow resistance of the permselective membrane and porous support structure. In fact, the flow resistance is determined by other complicated factors such as the cross-sectional shape and distribution of the pores in the support, the thickness of the membrane and the like. In this connection, it is to be noted that the permselective membrane of the patent to Hoover et al. consists of large particles of about from 2 to 20 microns, intermediate size particles and small particles of about from 0.02 to 4.0 microns which are irregularly accumulated in the pores of the support element. Such irregular accumulation of the particles will be an obstacle to the microfiltration of fluid and cause an unwanted clog of the pores in the membrane. Moreover, the permselective membrane is poor in resistance to heat since it is formed on the surface of the support element passageways using dispersions of the particles in a suspending liquid. The permselective thin membrane on the surface of the support element passageways is also less durable since 80–85% of the pores in the support element are in the 5–10 micron range.

SUMMARY OF THE INVENTION

It is, therefore, a primary object of the present invention to provide an improved honeycomb structure for fluid filtration wherein the flow resistance ratio between the filtration membrane and the porous support is determined to enhance the filtration efficiency of the structure.

According to the present invention, the object is attained by providing a honeycomb structure for fluid filtration which comprises a support of porous ceramic material having a multiplicity of axially parallel passageways extending therethrough and uniformly spaced by porous partition walls to permit flow of fluid under pressure passing therethrough and a selective membrane coated onto the surface of the passageways to separate one or more components from the fluid and to permit flow of filtrate passing therethrough to be carried through the partition walls to the exterior surface of the partition walls for collection, wherein the porous partition walls are formed to permit the passage of filtrate at a flow quantity more than twenty times the flow quantity of filtrate passing through the selective membrane and partition walls, and wherein an average pore size of the selective membrane is about from 10 to 10000 angstroms.

In the case that the passageways in the porous support are adapted to permit flow of pure water under pressure passing therethrough, the porous partition walls are formed to permit the passage of the pure water at a flow quantity more than twenty times the flow quantity of the pure water passing through the selective membrane and partition walls. In such a case, it is preferable that the flow quantity of the pure water passing through the selective membrane and partition walls is less than 1000 1/m·hr·kg/cm². In the case that the passageways in the porous support are adapted to permit flow of gaseous fluid under pressure passing therethrough, the porous partition walls are formed to permit the passage of pure nitrogen at a flow quantity more than twenty times the flow quantity of the pure nitrogen passing through the selective membrane and partition walls, and an average pore size of the selective membrane is less than 1000 angstrom. In this case, it is preferable that the flow quantity of the pure nitrogen passing through the selective membrane and partition walls is less than 1000 mol/m·hr·atm.

BRIEF DESCRIPTION OF THE DRAWINGS

Other objects, features and advantages of the present invention will be more readily appreciated from the following detailed description of preferred embodiments thereof when considered with reference to the accompanying drawings, in which.

DESCRIPTION OF THE PREFERRED EMBODIMENTS

Figure 1:
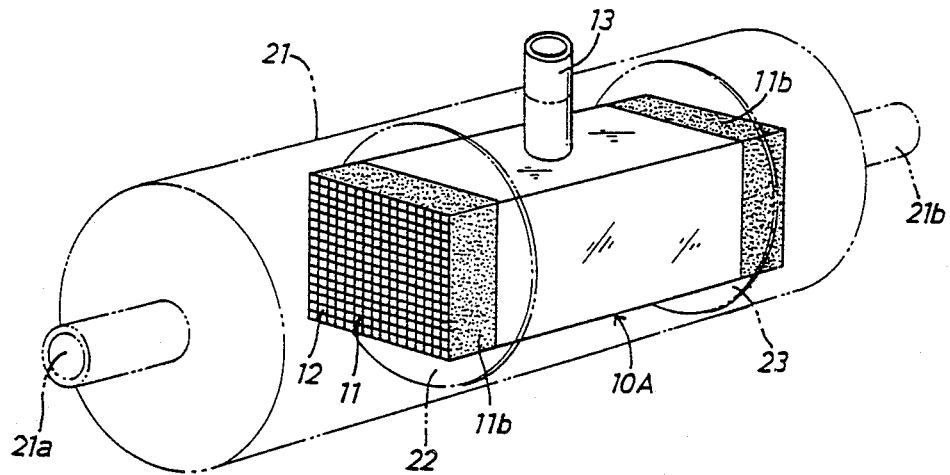
FIG. 1 is a schematic illustration of a filtration apparatus embodying a honeycomb structure in accordance with the present invention.
Figure 2:
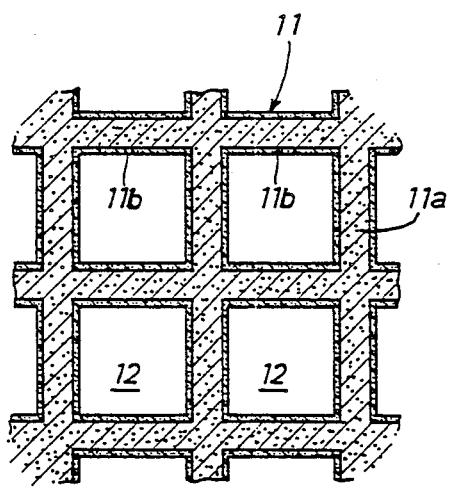
FIG. 2 is an enlarged cross-sectional view of a portion of the honeycomb structure shown in FIG. 1.

Referring now to the drawings, a honeycomb structure 10A for fluid filtration illustrated in FIG. 1 is in the form of an elorgated thin-walled honeycomb support element 11 having a square cross-sectional shape along its length. The support element 11 has a multiplicity of axially parallel passageways 12 extending therethrough. As shown in FIG. 2, the passageways 12 in support element 11 are of a square cross-sectional shape and uniformly spaced by porous partition walls 11a to permit flow of fluid under pressure passing therethrough. A selective filtration membrane 11b is coated onto the surface of each passageway 12 to separate one or more components from the fluid and to permit flow of filtrate passing therethrough to be carried through the partition walls 11a to the exterior surface of partition walls 11a for collection.

The support element 11 is contained within a cylindrical casing 21 which is provided thereon with a discharged pipe 13 for collection of filtrate and therein with a pair of axially spaced support plates 22 and 23. The support element 11 is held in place by means of the support plates 22 and 23 in such a manner that the exterior surface of partition walls 11a is positioned between the support plates 22 and 23. The discharge pipe 13 extends into the casing 21 and is secured at its inner end to a portion of the exterior surface of partition walls 11a in a liquid-tight manner. The remaining portion of the external surface of partition walls 11a between the support plates 22 and 23 is coated with a glaze. The opposite end portions of support element 11 located outside the support plates 22, 23 are each covered with the selective filtration membrane 11b, and the opposite end faces of partition walls 11a are each closed by an adhesive agent coated thereon. Assuming that an amount of liquid to be treated is supplied under pressure into the casing 21 from its inlet 21a, the passageways 12 in support element 11 permit the flow of liquid passing therethrough to be discharged from an outlet 21b of casing 21, and the selective membrane 11b in support element 11 permits the passage of filtrate and rejects selected solutes. After passage through the membrane 11b, the filtrate continues to pass through the partition walls 11a of support element 11, and exudes from the exterior surface of partition walls 11a to be discharged from the pipe 13.

Figure 3:
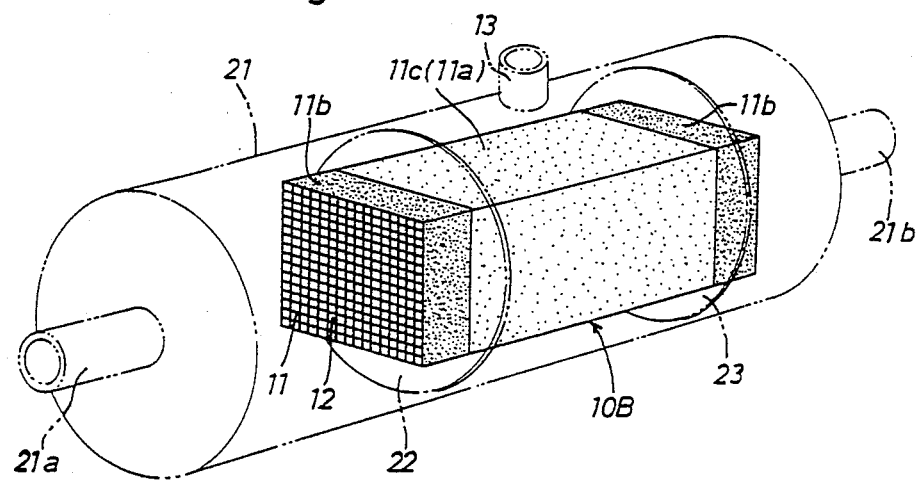
FIG. 3 is a schematic illustration of a modification of the filtration apparatus shown in FIG. 1.

In FIG. 3, the reference numeral 10B designates a modification of the honeycomb structure 10A wherein the support element 11 is carried in place by means of the support plates 22 and 23 in such a manner that the exterior surface 11c of partition walls 11a is exposed to an internal space between the support plates 22 and 23, and wherein the discharge pipe 13 has an inner end opening into the internal space between the support plates 22 and 23. Other construction is substantially the same as that of the honeycomb structure 10A shown in FIG. 1. Assuming that an amount of liquid to be treated is supplied under pressure into the casing 21 from its inlet 21a, the passageways 12 in support element 11 permit the flow of liquid passing therethrough to be discharged from the outlet 21b of casing 21, and the selective membrane 11b in support element 11 permits the passage of filtrate and rejects selected solutes. After passage through the membrane 11b, the filtrate continues to pass through the partition walls 11a of support element 11, and exudes from the exterior surface 11c of partition walls 11a to be discharged from the pipe 13.

Figure 4:
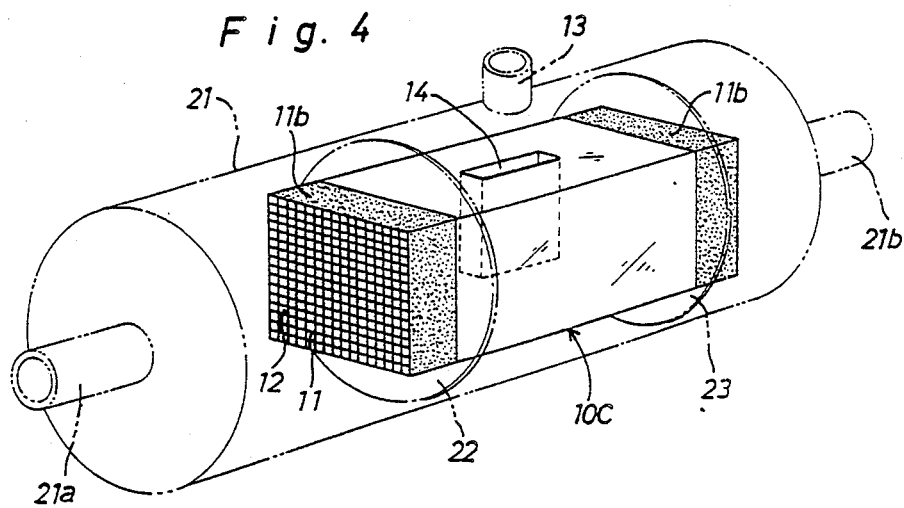
FIG. 4 is a schematic illustration of another modification of the filtration apparatus shown in FIG. 1.
Figure 5:
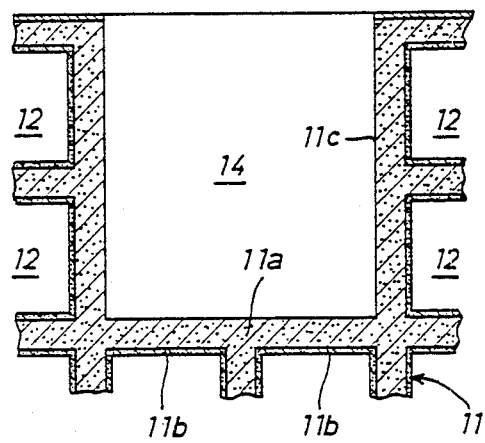
FIG. 5 is an enlarged cross-sectional view of a discharge cavity portion of the honeycomb structure shown in FIG. 4.

In FIG. 4, the reference numeral 10C designates another modification of the honeycomb structure 10A wherein the support element 11 has a discharge cavity 14 of rectangular cross-section formed therein and located in an internal space between the support plates 22 and 23, and wherein the discharge pipe 13 has an inner end opening into the internal spaced between support plates 22 and 23. In this modification, the exterior surface of partition walls 11a of support element 11 exclusive of the discharge cavity 14 is coated with a glaze in the same manner as the embodiment shown in FIG. 1. As shown in FIG. 5, the discharge cavity 14 is formed in the central portion of support element 11 to expose the exterior surface 11c of partition walls 11a therein. With such an arrangement, the discharge cavity 14 is useful to expedite the discharge of filtrate from partition walls 11a after passage through the selective membrane 11b. Other construction is substantially the same as that of the honeycomb structure 10A shown in FIG. 1.

In the porous support 11, the partition walls 11a were formed to have a thickness of about from 0.15 to 1.5 mm and an average pore size of about from 0.2 to 5.0 microns, and the selective membrane 11b was formed to have a thickness of about from 2 to 100 microns and an average pore size of about from 10 to 10000 angstroms. As will be discussed in detail later, the partition walls 11a were also formed to permit the passage of filtrate at a flow quantity more than twenty times the flow quantity of filtrate passing through the selective membrane and partition walls 11b and 11a. In a practical embodiment of the present invention, it is desirable that an additional porous wall layer is formed between the partition walls and selective membrane 11a and 11b or on the surface of selective membrane 11b. In such a case, it is preferable that the partition walls 11a are formed to have an average pore size of about from 2 to 5 microns and the additional wall layer is formed to have an average pore size of about from 0.2 to 2.0 microns. The additional wall layer formed between the partition walls 11a and selective membrane 11b is useful to form a fine and thin selective membrane on the surface of partition walls 11a. The additional wall layer formed on the selective membrane 11b is useful to protect the selective membrane from contaminants in the liquid.

Although in the embodiment of FIG. 1, the honeycomb structure 10A has been contained in the casing 21, it may be immersed in an amount of liquid under pressure in an appropriate container in such a manner that the discharge pipe 13 is arranged to discharge the filtrate from the partition walls 11a. In practical embodiments, the opposite end faces of support element 11 may be coated with the selective membrane.

In the present invention, the support element 11 was prepared by the following methods.

(a) A mixture containing 90 parts $\alpha$-$Al_2O_3$ particles having an average particle diameter of 0.8 micron and 10 parts kaolin was added with polyvinyl alcohol dissolved in water and kneaded. The kneaded mixture was extruded to form the matrix of a honeycomb structure and dried. Thereafter, the honeycomb structure was fired at 1350° C. for about 3 hours in a furnace. The finished support element had pores of 0.2 micron in average size and of 0.1 cc/g in pore volume.

(b) A mixture containing 90 parts $\alpha$-$Al_2O_3$ particles having an average particle diameter of 1.5 micron and 10 parts kaolin was prepared in the same manner as that of the above method (a). The finished support element had pores of 0.7 micron in average size and of 0.19 cc/g in pore volume.

(c) A mixture containing 90 $\alpha$-$Al_2O_3$ particles having an average particle diameter of 5 micron and 10 parts kaolin was prepared in the same manner as that of the above method (a). The finished support element had pores of 2.0 micron in average size and of 0.23 cc/g in pore volume. (d) A mixture containing 90 parts $\alpha$-$Al_2O_3$ particles having an average particle diameter of 12 micron and 10 parts kaolin was prepared in the same manner as that of the method (a). The finished support element had pores of 5.0 micron in average size and of 0.25 cc/g in pore volume.

(e) The mixture used in the method (a) was fired at 1500° C. in the furnace. The finished support element had pores of 0.1 micron in average size and of 0.07 cc/g in pore volume.

The selective membrane $11b$ was prepared by the following methods.

(A) Aluminum isopropoxide was hydrolyzed under heat and added with nitric acid to prepare a sol solution for slip casting. The, the support element prepared by the above-described methods was then immersed into the sol solution to form a membrane on the surface of the passageways and dried. Thereafter, the support element was fired at 400° C. for 3 hours in the atmospheric air to complete the membrane formation. The finished selective membrane had pores of 50 angstrom in average diameter and a thickness of 15 micron.

(B) A mixture of $\gamma$-$Al_2O_3$ and $\alpha$-$Al_2O_3$ particles each having a specific surface area of 30 m$^2$/g was added with nitric acid dissolved in water to prepare a slurry. The support element prepared by the above-described methods was then immersed into the slurry to form a membrane on the surface of the passageways and dried. Thereafter, the support element was fired at 1000° C. for 3 hours in the atmospheric air to complete the membrane formation. The finished selective membrane had pores of 400 angstrom in average diameter and a thickness of 50 micron.

(C) Particles of $\alpha$-$Al_2O_3$ having an average particle diameter of 0.5 micron were added with nitric acid and polyvinyl alcohol dissolved in water to prepare a slurry. The support element prepared by the above-described methods was then immersed into the slurry to form a membrane on the surface of the passageways and dried. Thereafter, the support element was fired at 1300° C. for 3 hours in the atmospheric air to complete the membrane formation. The finished selective membrane had pores of 2000 angstrom (0.2 micron) in average diameter and a thickness of 50 micron.

(D) Particles of $\alpha$-$Al_2O_3$ having an average particle diameter of 2 micron were added with nitric acid and polyvinyl alcohol dissolved in water to prepare a slurry. The support element prepared by the above-described methods was then immersed into the slurry to form a membrane on the surface of the passageways and dried. Thereafter, the support element was fired at 1400° C. for 3 hours in the atmospheric air to complete the membrane formation. The finished selective membrane had pores of 10000 angstrom (1 micron) in average diameter and a thickness of 15 micron.

(E) The membrane formed by the method (C) was fired at 400° C. for 3 hours in the atmospheric air to complete the membrane formation. The finished selective membrane had pores of 50 angstrom in average diameter and a thickness of 15 micron.

Figure 6:
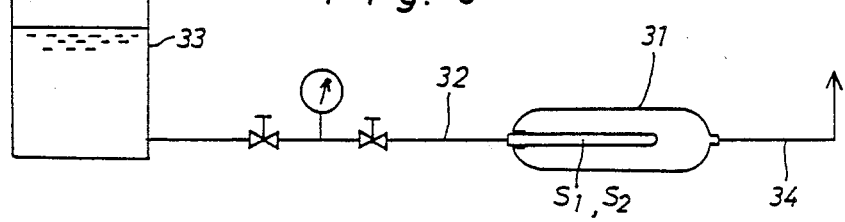
FIG. 6 is a schematic diagram of an apparatus for measurement of the flow quantity of liquid or pure water passing respectively through a filtration membrane and a porous support in specific test pieces.

For a test of permeability to water, cup-shaped support elements $S_1$ each having a diameter of 10 mm, a thickness of 1 mm and a length of 150 mm were prepared by the above-described methods (a)–(e) for measurement of permeability of the partition wall, and cup-shaped support elements $S_2$ each having a selective membrane formed by the above-described methods (A)–(E) were prepared for measurement of permeability of the selective membrane and partition wall. As shown in FIG. 6, the cup-shaped support elements $S_1$ and $S_2$ each were housed in a closed container 31 and connected at their open ends to a connecting pipe 32 in a liquid-tight manner. The connecting pipe 32 was connected to a water tank 33 which has been arranged to store an amount of fresh water supplied thereto through an activated carbon filter, an ion-exchanger and an ultrafiltration membrane (not shown). In such an arrangement, the cup-shaped support elements $S_1$ and $S_2$ each were supplied with the fresh water from tank 33 under a predetermined gauge pressure to measure a flow quantity of pure water passing therethrough and discharged through a pipe 34. The supply pressure of fresh water was determined to be 0.2–0.5 kg/cm$^2$ in measurement of the cup-shaped support elements $S_1$ and to be 1–3 kg/cm$^2$ in measurement of the cup-shaped support elements $S_2$. In the test described above, the permeability (C) of pure water was calculated by the following equation.

$$Q=V/(A \cdot \Delta P)$$

in which V is the discharged quantity of pure water (1/hr), A is the filtration area of the respective support elements (m$^2$), ard $\Delta$ is the supply pressure of fresh water (kg/cm$^2$).

For measurement of filtration characteristics, the support elements 10A-10C were each prepared to have a vertical width of 81 mm, a lateral width of 81 mm and a length of 150 mm. Square passageways 12 had been formed in the support element, each measuring 3.5 mm × 3.5 mm. The passageways 12 were each separated by partition walls $11a$ of 1 mm thickness. The volume of the support element was 984 cm$^3$, and the filtering surface area of membranes $11b$ was 6084 cm$^2$. The cylindrical casing 21 had been made of stainless steel to have a diameter of 120 mm and a length of 200 mm. In the casing 21 for support element 10A, the discharge pipe 13 had been formed to have an internal diameter of 20 mm. In the casing 21 for support element 10B, the exterior surface $11c$ of support element 10B was exposed in a length of 130 mm. In the casing 21 for support element 10C, the discharge cavity had been formed to have an opening of 13.5 mm × 50 mm and a depth of 45 mm.

The filtration characteristics of support elements 10A-10C were measured under the following conditions.

(I) An aqueous solution containing 1 wt% polyethylene glycol (10000 average molecular weight) was supplied into the support element at a velocity of 0.5 m/sec. The filtrate exuded from the exterior surface of support element 11 was then measured by a high performance liquid chromatography (HPLC) to calculate rejection of permeate at the selective membrane.

(II) An aqueous solution containing 1 wt% colloidal silica particles of 500 angstrom particle size was supplied into the support element at a velocity of 0.5 m/sec. The filtrate exuded from the exterior surface of support element 11 was then adequately dried at 100° C. The weight of solid contents was measured to calculate the concentration of filtrate and to calculate rejection of permeate at the selective membrane.

(III) An aqueous solution containing 1 wt% α-Al₂O₃ particles of 2 micron particle diameter was supplied into the support element at a velocity of 0.5 m/sec. The filtrate exuded from the exterior surface of support element 11 was then measured by HPLC to calculate rejection of permeate at the selective membrane.

For comparison with the support elements, two kinds of filtration structures 10D and 10E were tested in the same manner as in the support elements described above. The filtration structure 10D was composed of 144 parallel pipes each made of the same porous ceramic material as that of the support elements to have a length of 150 mm and formed therein with a selective membrane. The parallel pipes were bundled in a piece to have a square cross-section and contained within the casing 21 substantially in the same manner as in the support elements of the present invention. The bundled pipes had a volume of 8640 cm³ and a filtering area of 6782 cm². The filtration structure 10E was composed of 16 parallel pipes each made of the same porous ceramic material as that of the support elements to have the same length as that of the filtration structure 10D and formed therein with a selective membrane. The pipes were bundled and contained within the casing 21 in the same manner as the filtration structure 10D. The bundled pipes had a volume of 960 cm³ and a filtering area of 754 cm³

The measurement conditions and the results of support elements 10A–10C are indicated in the annexed Table 1 and 2.

In Table 2, it has been confirmed that the filtration characteristics of honeycomb structures Nos. 1–10 were excellent. In this respect, it is to be noted that the excellent filtration characteristics were obtained in conditions where the permeability ratio of the partition walls 11a to the selective membrane 11b was more than 20. In the case that the permeability ratio was more than 50, preferably 400, the permeation quantity increased to enhance the filtration efficiency of support elements. From the fact that the permeation velocity of water in the support elements 10A–10C Nos. 1–12 was substantially the same as that in the filtration structures 10D, 10E Nos. 13 and 14, it has been confirmed that the partition walls 11a act as the passage of filtrate. Furthermore, it has been confirmed that the volume of filtration structure 10D No. 13 was made about nine times the volume of support elements 10A–10C to obtain the same filtration characteristics.

The honeycomb structures 10A–10C of the present invention may be adapted for gas separation on the basis of Knudsen gas diffusion or capillary condensation. For such an application, the same support elements as those for liquid flitration were prepared, and the selective membrane 11b was prepared by the following methods.

(A) Aluminum isopropoxide was hydrolyzed under heat and added with nitric acid to prepare a sol solution for slip casting. The support element was then immersed into the sol solution to form a membrane on the surface of the passageways and dried. Thereafter, the support element was fired at 400° C. for 3 hours in the atmospheric air to complete the membrane formation.

TABLE 1

ATTACHMENT A

| Test No. | Type of Structure | Preparation Method | | Permeability (l/m² · hr · kg/cm²) | | Permeability Ratio | Filtration Condition |
| --- | --- | --- | --- | --- | --- | --- | --- |
| | | Partition Wall | Membrane | Partition Wall | Membrane | | |
| 1 | 10B | a | A | 100 | 5 | 20 | I |
| 2 | " | b | " | 1000 | " | 200 | " |
| 3 | " | c | " | 2700 | " | 540 | " |
| 4 | " | d | E | 40000 | " | 8000 | " |
| 5 | " | c | B | 2700 | 100 | 27 | II |
| 6 | " | d | " | 40000 | " | 400 | " |
| 7 | " | " | C | " | 500 | 80 | III |
| 8 | " | " | D | " | 1000 | 40 | " |
| 9 | 10A | c | A | 2700 | 5 | 540 | I |
| 10 | 10C | " | " | " | " | " | " |
| 11 | 10B | e | " | 70 | " | 14 | " |
| 12 | " | b | B | 1000 | 100 | 10 | II |
| 13 | 10D | c | A | 2700 | 5 | 540 | I |
| 14 | 10E | " | " | " | " | " | " |

TABLE 2

| Test No. | Membrane Area | Volume of Structure | Filtration Characteristics | | Velocity of Permeation (l/m² · hr · kg/cm²) |
| --- | --- | --- | --- | --- | --- |
| | | | Permeation (l/hr) | Rejection of Permeation (%) | |
| 1 | 6804 | 984 | 3.0 | 98 | 4.4 |
| 2 | " | " | 3.1 | " | 4.5 |
| 3 | " | " | 3.2 | 100 | 4.7 |
| 4 | " | " | " | " | " |
| 5 | " | " | 64.6 | 95 | 95 |
| 6 | " | " | 66.7 | 98 | 98 |
| 7 | " | " | 299.4 | 99 | 440 |
| 8 | " | " | 646.4 | 100 | 950 |
| 9 | " | " | 3.2 | 99 | 4.7 |
| 10 | 6594 | " | 3.1 | 100 | " |
| 11 | 6804 | " | 1.9 | " | 2.8 |
| 12 | " | " | 51.0 | 99 | 75 |
| 13 | 6782 | 8640 | 3.1 | 98 | 4.6 |
| 14 | 754 | 960 | 0.33 | 97 | 4.5 |

The finished selective membrane had pores of 50 angstrom in average diameter and a thickness of 15 micron.

(B) Silicate soda was impregnated into the membrane finished by the above method (A) and dried. Thereafter, the membrane was fired at 200° C. for 3 hours in the atmospheric air. The finished membrane had pores of 30 angstrom in average diameter and a thickness of 15 micron.

(C) Particles of α-$Al_2O_3$ having an average particle diameter of 0.5 micron were added with nitric acid and polyvinyl alcohol dissolved in water to prepare a slurry. Thus, the support element was immersed into the slurry to form a membrane on the surface of the passageways and dried. Thereafter, the support element was fired at 1300° C. for 3 hours in the atmospheric air to complete the membrane formation. The finished selective membrane had pores of 0.2 micron in average diameter and a thickness of 50 micron. Furthermore, the finished selective membrane was formed thereon with an additional membrane having pores of 50 angstrom in average diameter and a thickness of 15 micron which was formed by the above method (A).

(D) Particles of γ-$Al_2O_3$ having a specific surface area of 80 m²/g were added to nitric acid dissolved in water to prepare a slurry. Thus, the support element was immersed into the slurry to form a membrane on the surface of the passageways and dried. Thereafter, the support element was fired at 800° C. for 3 hours in the atmospheric air to complete the membrane formation. The finished selective membrane had pores of 100 angstrom in average diameter and a thickness of 50 micron.

(E) Zirconium hydroxide was added with nitric acid dissolved in water to prepare a slurry. Thus, the support element was immersed into the slurry to form a membrane on the surface of the passageways and dried. Thereafter, the support element was fired at 400° C. for 3 hours in the atmospheric air to complete the membrane formation. The finished selective membrane had pores of 250 angstrom in average diameter and a thickness of 80 micron.

Figure 7:
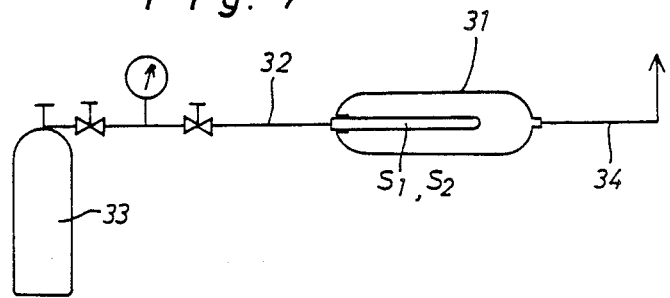
FIG. 7 is a schematic diagram of an apparatus for measurement of the flow quantity of gaseous fluid or nitrogen passing respectively through a filtration membrane and a porous support in specific test pieces.

For a test of permeability to gaseous fluid, cup-shaped support elements $S_1$ each having a diameter of 10 mm, a wall thickness of 1 mm and a length of 150 mm were prepared by the above-described methods (a)–(e) for measurement of permeability of the partition wall, and cup-shaped support elements $S_2$ each having a selective membrane formed by the above-described methods (a)–(e) were prepared for measurement of permeability of the selective membrane and partition wall. As shown in FIG. 7, the cup-shaped support elements $S_1$ and $S_2$ each were housed in a closed container 31 and connected at their open ends to a connecting pipe 32 in an air-tight manner. The connecting pipe 32 was connected to a gas cylinder 33 which is arranged to store an amount of nitrogen gas under a predetermined pressure. In such arrangement, the cup-shaped support elements $S_1$ and $S_2$ each were supplied with the nitrogen gas under pressure to measure a flow quantity of nitrogen gas passing therethrough and discharged through a pipe 34. The supply pressure of nitrogen gas was determined to be 0.2–0.5 atm in measurement of the cup-shaped support elements $S_1$ and to be 1–3 atm in measurement of the cup-shaped support elements $S_2$. In the test described above, the permeability Q of nitrogen gas was calculated by the following equation.

$$Q = V/(A \cdot \Delta P)$$

in which V is the discharged quantity of nitrogen gas (mol/hr), A is the filtration area of the respective support elements (m²), and ΔP is the supply pressure of nitrogen gas (atm).

For measurement of filtration characteristics, the support elements 10A–10C were each prepared to have a vertical width of 81 mm, lateral width of 81 mm and a length of 150 mm. Square passageways 12 had been formed in the support element, each measuring 3.5 mm × 3.5 mm. The passageways 12 were each separated by partition walls 11a of 1 mm thickness. The volume of the support element was 984 cm³, and the filtering surface area of membranes 11b was 6804 cm². The cylindrical casing 21 had been made of stainless steel to have a diameter of 120 mm and a length of 200 mm. In the casing 21 for support element 10A, the discharge pipe 13 had been formed to have an internal diameter of 20 mm. In the casing 21 for support element 10B, the exterior surface 11c of support element 10B was exposed in a length of 130 mm. In the casing 21 for support element 10C, the discharge cavity 14 had been formed to have an opening of 13.5 mm × 50 mm and a depth of 45 mm.

The dehumidification characteristics of support elements 10A–10C were measured as follows. Fresh air of 70% relative humidity and 25° C. was supplied at a flow rate of 6 m³/hr into the respective support elements. In addition, the pressure at discharge pipe 13 was decreased to 5–10 torr. For comparison with the support elements, two kinds of filtration structures 10D and 10E were tested in the same manner as in the support elements described above. The filtration structure 10D was composed of 144 parallel pipes each made of the same porous ceramic material as that of the support elements to have a length of 150 mm and formed thereon with a selective membrane. The parallel pipes were bundled in a piece to have a square cross-section and contained within the casing 21 substantially in the same manner as in the support elements of the present invention. The bundled pipes had a volume of 8640 cm₃ and a filtering area of 6782 cm². The filtration structure 10E was composed of 16 parallel pipes each made of the same porous ceramic material as that of the support elements to have the same length as that of the filtration structure 10D and formed thereon with a selective membrane. The pipes were bundled and contained within the casing 21 in the same manner as in the filtration structure 10D. The bundled pipes had a volume of 960 cm³ and a filtering area of 754 cm².

The measurement conditions and results of support elements 10A–10C are indicated in the annexed Tables 3 and 4.

TABLE 3

| Test No. | Type of Structure | Preparation Method | | Permeability (mol/m² · hr · atm) | | Permeability Ratio |
|---|---|---|---|---|---|---|
| | | Partition Wall | Membrane | Partition Wall | Membrane | |
| 1 | 10B | a | A | 1000 | 50 | 20 |
| 2 | " | b | A | 2400 | 50 | 48 |
| 3 | " | c | A | 5100 | 50 | 102 |
| 4 | " | c | B | 5100 | 5 | 1020 |
| 5 | " | d | C | 9500 | 50 | 190 |
| 6 | " | d | D | 9500 | 100 | 95 |
| 7 | " | c | D | 5100 | 100 | 51 |
| 8 | " | c | E | 5100 | 200 | 26 |
| 9 | 10A | c | A | 5100 | 50 | 102 |
| 10 | 10C | c | A | 5100 | 50 | 102 |
| 11 | 10B | e | A | 500 | 50 | 10 |

TABLE 3-continued

| Test No. | Type of Structure | Preparation Method Partition Wall | Preparation Method Membrane | Permeability (mol/m² · hr · atm) Partition Wall | Permeability (mol/m² · hr · atm) Membrane | Permeability Ratio |
|---|---|---|---|---|---|---|
| 12 | 10D | c | A | 5100 | 50 | 102 |
| 13 | 10E | c | A | 5100 | 50 | 102 |

TABLE 4

| Test No. | Relative Temperature in Air (%) Inlet | Relative Temperature in Air (%) Outlet | Dehumidified Amount (g/m² hr) | Membrane Area (cm²) | Volume of Structure (cm³) | Leakage of Air (mol/m² hr) |
|---|---|---|---|---|---|---|
| 1 | 70 | 25.8 | 98 | 6804 | 984 | 1.2 |
| 2 | " | 24.4 | 101 | " | " | 1.3 |
| 3 | " | 24.9 | 100 | " | " | 1.2 |
| 4 | " | 20.3 | 110 | " | " | 0.2 |
| 5 | " | 20.4 | 110 | " | " | 1.0 |
| 6 | " | 25.9 | 98 | " | " | 2.5 |
| 7 | " | 25.3 | 99 | " | " | 2.5 |
| 8 | " | 26.7 | 96 | " | " | 5.0 |
| 9 | " | 25.3 | 99 | " | " | 2.1 |
| 10 | " | 24.1 | 105 | 6594 | " | 2.0 |
| 11 | " | 45.1 | 55 | 6804 | " | 2.0 |
| 12 | " | 25.0 | 100 | 6782 | 8640 | 1.8 |
| 13 | " | 65.0 | 100 | 754 | 960 | 1.9 |

In Table 3, it has been confirmed that the dehumidification characteristics of honeycomb structures Nos. 1–10 were excellent. In this respect, it is to be noted that the excellent dehumidification characteristics were obtained in conditions where the permeability ratio of the partition walls 11a to the selective membrane 11b was more than 20. In the case that the permeability ratio was more than 50, the permeation quantity increased to enhance the dehumidification efficiency of support elements.

What is claimed is:

1. A honeycomb structure for fluid filtration comprising means for providing a resistance ratio between a selective membrane and a support of porous ceramic material sufficient to substantially enhance filtration efficiency of the honeycomb structure, said structure comprising:
   a support of porous ceramic material having a plurality of axially parallel passageways extending therethrough and uniformly spaced by porous partition walls to permit flow of pressurized fluid therethrough; and
   a selective membrane coated onto the surface of the passageways to separate one or more components from the fluid and to permit flow of filtrate passing therethrough to be carried through the porous partition walls to an exterior surface of the partition walls for collection, said selective membrane having an average pore size of about 10–10,000 angstroms;
   wherein the porous partition walls are formed to permit the passage of filtrate therethrough at a flow quantity which is more than 20 times the flow quantity of filtrate passing through said selective membrane and said partition walls, collectively.

2. The honeycomb structure of claim 1, wherein porous partition walls are formed to permit the passage of filtrate therethrough at a flow quantity which is more than fifty times the flow quantity of filtrate passing through said selective membrane and said partition walls, collectively.

3. The honeycomb structure of claim 1, wherein the passageways in the porous support are formed to permit passage of pure water under pressure therethrough at a flow quantity which is more than twenty times the flow quantity of the pure water passing through said selective membrane and said partition walls, collectively.

4. The honeycomb structure of claim 3, wherein the flow quantity of the pure water passing through said selective membrane and said partition walls, collectively, is less than 1000 1/m²·hr·kg/cm².

5. The honeycomb structure of claim 1, wherein an average pore size of the support is about 0.2–5.0 microns, and the selective membrane is in the form of a sintered body of substantially uniform particles.

6. The honeycomb structure of claim 1, wherein the exterior surface of the porous partition walls is exposed only at one side portion thereof to permit collection of the flow of filtrate discharged therefrom.

7. The honeycomb structure of claim 1, wherein the exterior surface of the porous partition walls is exposed only at one end portion thereof to permit collection of the flow of filtrate discharged therefrom.

8. The honeycomb structure of claim 1, wherein the porous support has a cavity formed therein in such a manner that the exterior surface of the porous partition walls is exposed to an interior of the cavity to permit collection of the flow of filtrate discharged therefrom into the cavity.

9. The honeycomb structure of claim 1, wherein the passageways in the porous support permit passage of gaseous fluid under pressure therethrough, and the porous partition walls permit passage of pure nitrogen at a flow quantity which is more than twenty times the flow quantity of pure nitrogen passing through said selective membrane and said partition walls, collectively, and said selective membrane has an average pore size of less than 1000 angstroms.

10. The honeycomb structure of claim 9, wherein the flow quantity of pure nitrogen passing through the selective membrane and partition walls, collectively, is less than 1000 mol/m²·hr·atm.

11. The honeycomb structure of claim 9, wherein the flow quantity of pure nitrogen passing through said selective membrane and said partition walls, collectively, is about 5 to 250 mol/m²·hr·atm.

12. The honeycomb structure of claim 1, wherein an average pore size of the support is about 0.2–5.0 microns, and the selective membrane is in the form of a sintered body of substantially uniform particles.

13. The honeycomb structure of claim 1, further comprising an additional porous wall layer formed between said porous partition walls and said selective membrane.

14. The honeycomb structure of claim 13, wherein said additional porous wall layer has an average pore size of about 0.2–2.0 microns.

* * * * *

UNITED STATES PATENT AND TRADEMARK OFFICE
CERTIFICATE OF CORRECTION

PATENT NO. : 4,894,160
DATED : January 16, 1990
INVENTOR(S) : Fumio ABE et al.

It is certified that error appears in the above-identified patent and that said Letters Patent is hereby corrected as shown below:

In column 12, lines 54-57, please change claim 12 to read as follows:

12. The honeycomb structure of claim 3, wherein the flow quantity of pure water passing through said selective membrane and said partition walls, collectively, is about 5 to 1,000 $l/m^2 \cdot hr \cdot kg/cm^2$.

Signed and Sealed this

Fifteenth Day of May, 2001

Attest:

NICHOLAS P. GODICI

Attesting Officer

Acting Director of the United States Patent and Trademark Office